(12) United States Patent
Pichkur et al.

(10) Patent No.: US 9,450,389 B2
(45) Date of Patent: Sep. 20, 2016

(54) ELECTRICAL POWER TRANSMISSION SYSTEM AND METHOD

(71) Applicants: Yaroslav Andreyevich Pichkur, Ridgewood, NY (US); Andrew Lloyd Tiajoloff, New York, NY (US)

(72) Inventors: Yaroslav Andreyevich Pichkur, Ridgewood, NY (US); Andrew Lloyd Tiajoloff, New York, NY (US)

(73) Assignee: Yaroslav A. Pichkur, Bronx, NY (US)

( * ) Notice: Subject to any disclaimer, the term of this patent is extended or adjusted under 35 U.S.C. 154(b) by 720 days.

(21) Appl. No.: 13/785,209

(22) Filed: Mar. 5, 2013

(65) Prior Publication Data

US 2014/0251684 A1    Sep. 11, 2014

(51) Int. Cl.
G05F 3/02 (2006.01)
H01B 7/00 (2006.01)
H01B 7/18 (2006.01)
H02G 3/00 (2006.01)
H01F 27/28 (2006.01)

(52) U.S. Cl.
CPC ............ *H02G 3/00* (2013.01); *H01F 27/2828* (2013.01)

(58) Field of Classification Search
CPC ........................................................ G05F 3/02
USPC ............................................. 174/72 R, 117 R
See application file for complete search history.

(56) References Cited

U.S. PATENT DOCUMENTS

| 1,804,478 | A | | 5/1931 | Parker |
| 2,057,529 | A | * | 10/1936 | Karapetoff ................. H02J 3/04 307/147 |
| 2,249,509 | A | | 7/1941 | Welch, Jr. et al. |
| 2,669,603 | A | | 2/1954 | Prache |
| 2,932,805 | A | | 4/1960 | Doherty |
| 3,229,030 | A | | 1/1966 | Baermann |
| 3,238,477 | A | | 3/1966 | Brucekmann |
| 3,675,042 | A | | 7/1972 | Merriam |
| 3,694,563 | A | | 9/1972 | Monds et al. |
| 4,017,344 | A | | 4/1977 | Lorber et al. |
| 4,086,427 | A | | 4/1978 | Nasuta, Jr. et al. |
| 4,117,259 | A | | 9/1978 | Giebel et al. |
| 4,346,258 | A | | 8/1982 | Kunze |
| 4,486,623 | A | | 12/1984 | Ploppa |

(Continued)

FOREIGN PATENT DOCUMENTS

JP     9180550        7/1997
WO     2014/006622 A1 1/2014

OTHER PUBLICATIONS

Espacenet. English language abstract of JP 9180550, Sasagawa et al. Jul. 11, 1997.

(Continued)

*Primary Examiner* — Jenny L Wagner
*Assistant Examiner* — Michael E Moats, Jr.
(74) *Attorney, Agent, or Firm* — Tiajoloff & Kelly LLP

(57) ABSTRACT

A power carrier transmits an electrical current to and from a load. The carrier has a set of wires carrying electricity in parallel to the load and another set of wires carrying the electricity back in parallel from the load. The wires are organized with equal numbers of wires form each set grouped around a junction alternatingly, so that as a result the magnetic fields created by the electricity flowing through the two sets of wires cancel each other out in the junction. The carrier may have several junctions in a rectangular matrix pattern or hexagonal close-packed pattern, or other patterns, e.g., octagonal, which may be combined with junctions with different numbers of wires. The resulting power carrier has a reduced external magnetic field.

23 Claims, 10 Drawing Sheets

(56) References Cited

U.S. PATENT DOCUMENTS

| | | | |
|---|---|---|---|
| 4,538,022 A | 8/1985 | Barnicol-Ottler et al. | |
| 4,692,566 A | 9/1987 | Kauffman | |
| 4,707,671 A | 11/1987 | Suzuki et al. | |
| 4,751,614 A | 6/1988 | Mehnert | |
| 4,800,236 A | 1/1989 | Lemke | |
| 4,818,820 A | 4/1989 | LaRock | |
| 4,843,356 A | 6/1989 | Lusignan et al. | |
| 4,937,401 A | 6/1990 | Lee | |
| 4,997,992 A | 3/1991 | Low | |
| 5,027,478 A | 7/1991 | Suhr | |
| 5,036,891 A | 8/1991 | Vogelsang | |
| 5,051,034 A | 9/1991 | Goodman | |
| 5,084,594 A | 1/1992 | Cady et al. | |
| 5,149,915 A | 9/1992 | Brunker et al. | |
| 5,243,138 A | 9/1993 | Guthke et al. | |
| RE34,701 E | 8/1994 | Goodman | |
| 5,552,565 A | 9/1996 | Cartier et al. | |
| 5,616,969 A * | 4/1997 | Morava | H02G 7/20 174/355 |
| 5,640,314 A | 6/1997 | Glasband et al. | |
| 5,703,330 A | 12/1997 | Kujawski | |
| 5,742,982 A | 4/1998 | Dodd et al. | |
| 5,760,340 A | 6/1998 | Orr, Jr. et al. | |
| 6,027,679 A | 2/2000 | O'Brien et al. | |
| 6,215,062 B1 | 4/2001 | Kimber | |
| 6,241,920 B1 | 6/2001 | Cotter et al. | |
| 6,353,186 B1 | 3/2002 | Dams et al. | |
| 6,365,836 B1 | 4/2002 | Blouin et al. | |
| 6,462,462 B2 | 10/2002 | Steinkopff | |
| 6,506,971 B1 | 1/2003 | Grach et al. | |
| 6,649,842 B1 | 11/2003 | Nishino | |
| 6,867,674 B1 | 3/2005 | Schutte et al. | |
| 6,870,105 B2 | 3/2005 | Maydanich et al. | |
| 6,969,807 B1 | 11/2005 | Lin et al. | |
| 7,009,105 B2 | 3/2006 | Chou | |
| 7,126,055 B1 | 10/2006 | Low et al. | |
| 7,202,416 B2 | 4/2007 | Komuro et al. | |
| 7,633,014 B2 | 12/2009 | Allais et al. | |
| 7,709,741 B2 | 5/2010 | Reichert et al. | |
| 7,772,495 B2 * | 8/2010 | Wu | H01B 7/425 174/113 C |
| 7,923,642 B2 | 4/2011 | Corso | |
| 7,964,797 B2 | 6/2011 | Clark et al. | |
| 8,120,546 B2 | 2/2012 | Smith et al. | |
| 8,155,491 B2 | 4/2012 | Lapp | |
| 8,586,868 B2 | 11/2013 | Liu et al. | |
| 2005/0077067 A1 | 4/2005 | Chou | |
| 2005/0247472 A1 | 11/2005 | Helfer et al. | |
| 2008/0179969 A1 * | 7/2008 | Dooley | H01B 7/306 307/147 |
| 2009/0205866 A1 | 8/2009 | Bremnes | |
| 2009/0273538 A1 | 11/2009 | Smith et al. | |
| 2011/0240341 A1 | 10/2011 | Lipiansky et al. | |

OTHER PUBLICATIONS

Lee Bee Huat. "Speaker Cables, Single Cables (single)". www.leebeehuat.com/cable_pg35.html. 2005.

New World Encyclopedia. "Dipole". http://www.newworldencyclopedia.org/entry/Dipole. Page last modified on Oct. 1, 2008.

Fiolhais, M.C.N. "Magnetic Field and Current are Zero Inside Ideal Conductors". "Progress in Electromagnetics Research B". vol. 27, pp. 187-212, 2011.

Wikipedia. "Balanced Line". http://en.wikipedia.org/wiki/Balanced_line. Mar. 20, 2012.

Wikipedia. "Quadripole Magnet". http://en.wikipedia.org/wiki/Quadrupole_magnet. Retrieved Apr. 1, 2012.

Wikipedia. "Inductive Coupling". http://en.wikipedia.org/wiki/Inductive_coupling. Aug. 14, 2012.

Wikipedia. "Perfect Conductor". http:/en.wikipedia.org/wiki/Perfect_conductor. Mar. 20, 2012.

Wikipedia. "Metamaterial Cloaking". http://en.wikipedia.org/wiki/Metamaterial_cloaking. Dec. 14, 2012.

* cited by examiner ical power transmittal system according to the invention.
ELECTRICAL POWER TRANSMISSION SYSTEM AND METHOD

FIELD OF THE INVENTION

This invention relates to systems for transmitting power, and more particularly to transmitting power with reduced magnetic field effects outside the conductor.

BACKGROUND OF THE INVENTION

The use of conducting wires to carry electrical power is well known, as is the fact that a current passing through a conductor generates an external magnetic field around the conductor.

In many environments, magnetic fields of this type are undesirable, such as under high-power transmission lines or in power cords in certain locations, or generally any area where people or animals are exposed to high magnetic fields. For example, power supplies for pacemakers implanted in a person's body transmit power inside the person's body, and a magnetic field there is undesirable. As another example, in the context of hybrid cars, power is supplied via cables within the body of the car, usually as relatively high-amperage, high-voltage alternating current, e.g., 360 volt AC, which can produce undesirable exposure of people in the car to high magnetic fields.

The prior art reflects some efforts to reduce the effect of a magnetic field around a conductor. For example, shielding methods have also been employed in the prior art using magnetized materials. Shielding to block magnetic fields generally involves application of a coating or surrounding cover that prevents some of the magnetic field around the conductors from extending through it.

Depending on the material used, the coating material can be relatively expensive. Also, it may be vulnerable to damage so that the magnetic field leaks through. Even if intact, there is a degree of magnetism that is not interrupted by the shielding, and that may, depending on the conditions, constitute an unacceptable level of magnetic field around the conductor.

SUMMARY OF THE INVENTION

It is therefore an object of the present invention to provide a system and method for transmitting electrical power that overcomes the drawbacks of the prior art.

According to an aspect of the invention, a power carrier for transmitting an electrical current to and from a load comprises a proximal end having first and second proximal electrical connections leading thereto. A first set comprising at least three electrical conductors are all electrically connected in parallel with the first proximal electrical connection, and a second set comprising at least three electrical conductors are all electrically connected in parallel with the second proximal electrical connection. The electrical conductors extend over a length of the carrier and are supported so as to be electrically separate from each other over the length in a cross-sectional arrangement relative to one another in the carrier. A distal end is opposite the proximal end and has first and second distal electrical connections leading therefrom. The first set of electrical conductors are all electrically connected in parallel with the first distal electrical connection, and the second set of electrical conductors are all electrically connected in parallel with the second distal electrical connection. The first and second sets of electrical conductors are positioned in the cross-sectional arrangement such that the arrangement includes at least one junction area surrounded by at least two electrical conductors of each of the sets that are organized so as to alternate between the electrical conductors of the first set and the electrical conductors of the second set. The electrical conductors around the junction area are at a distance from adjacent electrical conductors of the other set so that respective magnetic field passageways are defined between each of the electrical conductors and the adjacent electrical conductors.

According to another aspect of the invention, a power carrier for transmitting an electrical current comprises a proximal end having first and second proximal electrical connections leading to it. A distal end is opposite the proximal end and has first and second distal electrical connections leading from it. A first set of electrical conductors are all electrically connected in parallel between the first proximal electrical connection and the first distal electrical connection, and a second set of electrical conductors are all electrically connected in parallel between the second proximal electrical connection and the second distal electrical connection. The electrical conductors extend over a length of the carrier and each is surrounded by insulating material so as to be electrically separate from each other over the length in a cross-sectional arrangement relative to one another in the carrier. The cross-sectional area remains constant over the length of the carrier. The first set of electrical conductors all are electrically connected in parallel with the first distal electrical connection, and the second set of electrical conductors are all electrically connected in parallel with the second distal electrical connection. The first and second sets of electrical conductors are positioned in the cross-sectional arrangement so that a number of junction areas are defined between groups of electrical conductors. An equal number not less than two of electrical conductors of each of the sets are positioned so as to be equidistant from a respective center point of each junction area, to be spaced around the centerpoint at equal angular displacements relative to each other, and to alternate between the electrical conductors of the first set and the electrical conductors of the second set. The cross sectional arrangement of the electrical conductors is a rectangular matrix with at least four junction areas or a hexagonally packed pattern with at least seven junction areas.

According to another aspect of the invention, a method of transmitting electrical power comprises providing a carrier as described above, and supplying electrical current to the first proximal electrical contacts so that the current flows through the first set of conductors to the first distal electrical connection, through a transformer and to a load. A return electrical current is received from the load via the transformer to the second distal electrical connection and through the second set of electrical conductors.

Other objects and advantages of the invention will become apparent in the specification herein, and the scope of the invention will be set out in the claims.

DETAILED DESCRIPTION

Reference will now be made in detail to the preferred embodiments of the invention.

Figure 1:
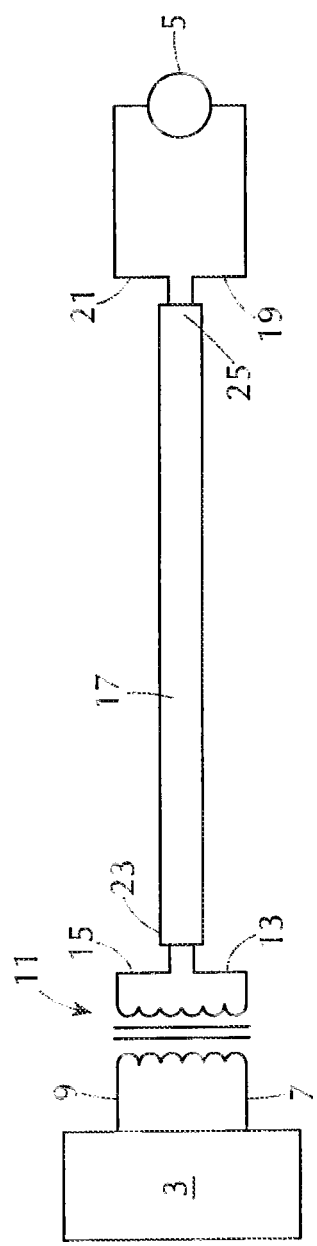
FIG. 1 is a schematic diagram of a circuit utilizing an electrical power transmittal system according to the invention.

FIG. 1 is a schematic diagram of a basic circuit with an electrical power transmittal system carrying an electrical current, both a forward and a return current, between a power source 3 and a load 5. Power source 3 applies either two poles of electrical power to two wires or electrical conductor lines 7 and 9. The power source may be DC or AC, and the two poles of electrical power may be positive and negative poles of DC current, two complementary phases of AC, or a phase or pole of AC or DC and a connection to ground.

Lines 7 and 9 are connected with a step-up or step-down transformer generally indicated at 11. Transformer 11 increases or decreases the voltage of electrical power applied via lines 7 and 9 and outputs the increased or decreased voltage electrical power on leads 13 and 15 that lead to a proximal end 23 of power carrier 17. Power carrier 17 extends over a length that may be as long or short as required by the specific application.

The distal end 25 of the carrier 17 has two output wires or electrical conductor lines 19 and 21. Output lines 19 and 21 are connected to two respective connections to load 5 and transmit the electrical power to them. Load 5 can be any electrical device, e.g., a light source, a motor, or any kind of circuitry that uses the electrical power for its operation.

In operation, the power source applies electrical power to line 7, the power is converted to a different voltage current flowing on wire 13, flows through power carrier 17 and output wire 19 to reach load 5. On the other side of load 5, a return electrical current flows along line 21, through carrier 17, and line 15 to reach the other side of the transformer 11. The other input side of transformer 11 connects with wire 9 going back to power source 3, or to ground if appropriate.

Figure 2:
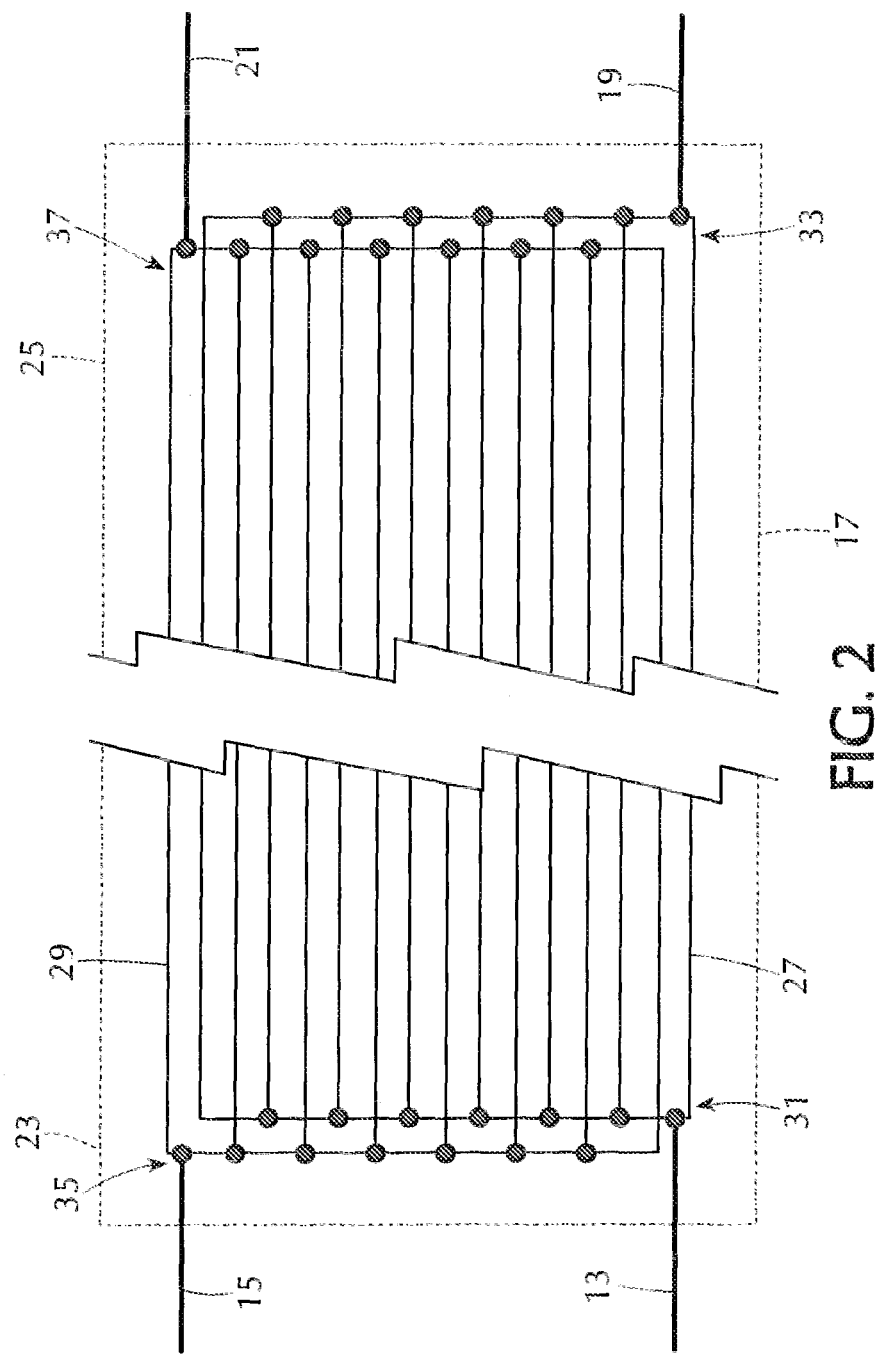
FIG. 2 is a schematic diagram of the parallel connection of wires in an electrical carrier according to the invention.

Referring to the schematic diagram of FIG. 2, the power carrier 17 comprises two sets of wires 27 and 29, with all of the wires of each set being connected in parallel. The first ends of wires of set 27 connect electrically in parallel to line 13 via a branch structure generally indicated at 31, and the opposite second ends of the wires of set 27 connect in parallel to line 19 via a branch structure 33. The first ends of wires of set 29 connect electrically in parallel to line 13 via a branch structure generally indicated at 35, and the opposite second ends of the wires off set 29 connect in parallel to line 21 via a branch structure 37. While FIG. 2 shows each set of wires comprising eight wires, it may be understood that the sets of conductors may comprise a variety of numbers of wires all connected in parallel, as will be discussed further below.

Figure 3:
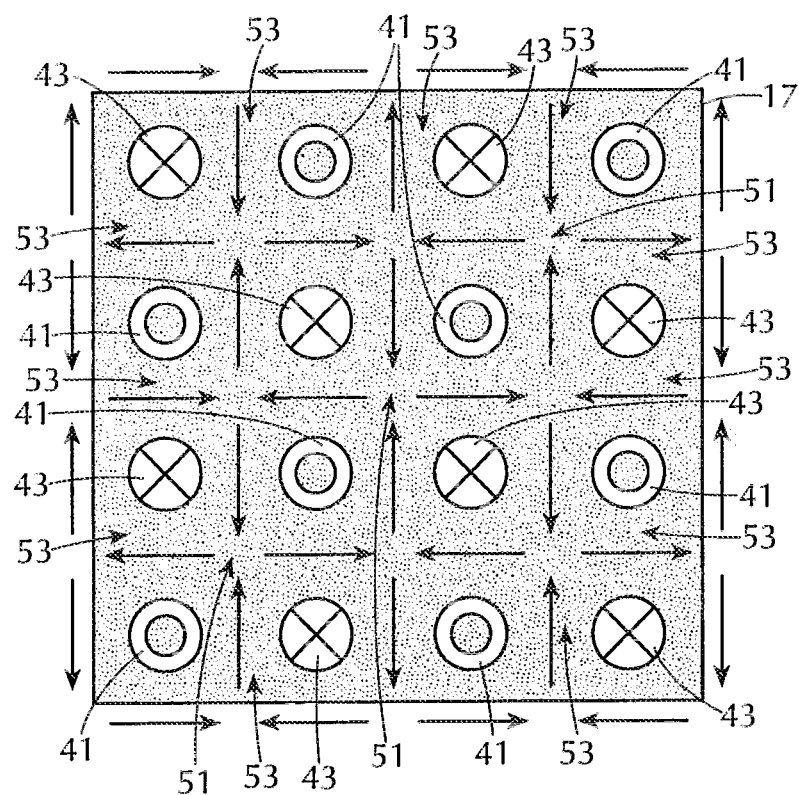
FIG. 3 is a schematic diagram of a cross-section of a 16-wire embodiment according to the invention.

FIG. 3 is a schematic diagram of a cross-section of the carrier 17 of a preferred embodiment of the invention. In this embodiment, the wires are supported in a square or rectangular 4×4 matrix, and that cross-sectional arrangement is preferably constant over the length of the carrier. There are two sets of wires connected in parallel, eight wires 41 and eight wires 43. The material of the carrier 17 is generally square in cross-section and is electrically insulating, so that each of the wires 41 and 43 is electrically insulated from the others.

Wires 41 carry the electrical current in one direction (i.e., coming out of the diagram in FIG. 3) and wires 43 carrying the returning current (i.e., in the direction into the diagram of FIG. 3). Magnetic fields around wires 41 flow counterclockwise in the plane of FIG. 3, and the magnetic fields around wires 43 flow clockwise. The arrows indicate the direction of the magnetic field formed by the wires as current flows through them to and from the load.

In the matrix arrangement of FIG. 3, the wires are organized in four rows and columns. The wires adjacent each wire in the same row or column are of the other set of wires, i.e., wires 41 have wires 43 adjacent them in the same row or column, and wires 43 have wires 41 adjacent them in the same row or column. Because the magnetic fields of these row-adjacent or column-adjacent wires flow in the opposite direction, in the interstitial magnetic flow regions 53 between the row-adjacent or column-adjacent wires, the magnetic fields around the two neighboring wires extend in the same direction.

Figure 4:
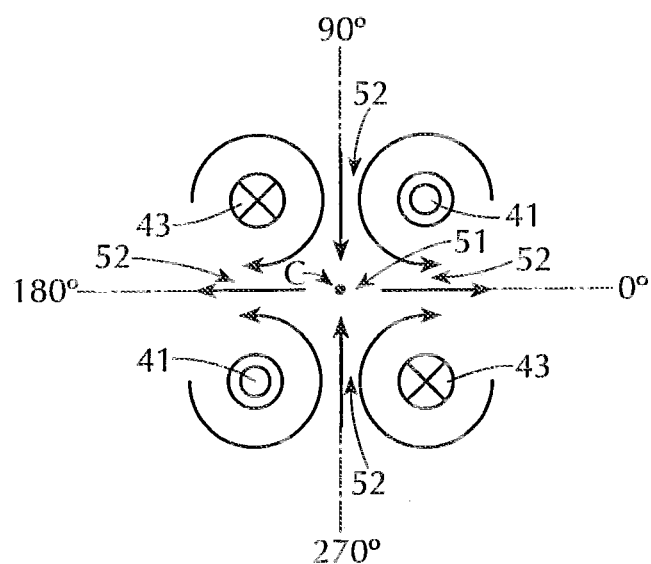
FIG. 4 is a detail partial diagram illustrating an exemplary one of the magnetically balanced junctions in the carrier of FIG. 3.

FIG. 4 shows a detail of one of the junctions 51. Junction 51 has four conductors surrounding its center point C, a first pair of conductors 41 carrying current in a direction out of the diagram, and a second pair of wires 43 carrying current into the diagram. The four conductors are arranged to surround the junction 51 spaced angularly from each other at a 90 degree offset, so that their centers are located at 45°, 135°, 225° and 315°, and they define interstitial magnetic flow regions 52 aligning at 0°, 90°, 180°, and 270° of counterclockwise rotation measured from the horizontal axis around the center point C. In the junction area 51, the magnetic fields around wires 41 and 43 in the row-direction flow away from the junction 52 in opposite directions, and they also combine to cancel each other out. Similarly, the magnetic fields around wires 41 and 43 in the column-direction flow in opposite directions into the junction 52, and combine to cancel each other out. There is as a result substantially no magnetic field at each junction 52.

As seen in FIG. 3, two of the wires 41 and 43 of each junction 51 are shared with the neighboring row-adjacent or column-adjacent junctions. Each junction has a net magnetic field that is canceled out to zero in the vertical and horizontal directions.

On the outer surface of the carrier, at the inter-row and inter-column magnetic flow regions 53 between the wires, the magnetic field extending along parallel to the surface by the adjacent wires cancels out the magnetic field extending along the surface on the other side of the magnetic flow region, reducing the magnetism outside the carrier 17. There is some magnetic field created by the current in the adjacent surface wires that extends directly outward or inward, but its magnitude is not as great as the magnitude around an ordinary conductor pair. The ultimate result is a reduced magnetic field around the carrier 17.

The cross-sectional arrangement of FIG. 3 is substantially constant over the length of the carrier 17, and preferably the carrier 17 is a rectangular parallelepiped. Alternatively, the cross-sectional arrangement rotates spirally over the length of the carrier, with the relative positions of the wires staying the same at all cross-sections over the length of the carrier 17.

The relative positions and currents flowing in the wires in the carrier 17 may result in some capacitance between the wires. The degree of capacitance can be adjusted or reduced by the presence in the interstitial regions 53 of material that has a dielectric-altering effect. In particular, conductive or ferromagnetic material may be placed in the interstitial regions so as to reduce the capacitance in the carrier 17.

In addition to the matrix arrangement shown in FIG. 3, other square or rectangular matrix-type configurations may be employed as a carrier, e.g., carrier 17, to reduce magnetic field outside the carrier as well. The matrix preferably has two or more junctions, e.g., the cross section should be a 2×3 matrix of wires or larger.

Figure 5:
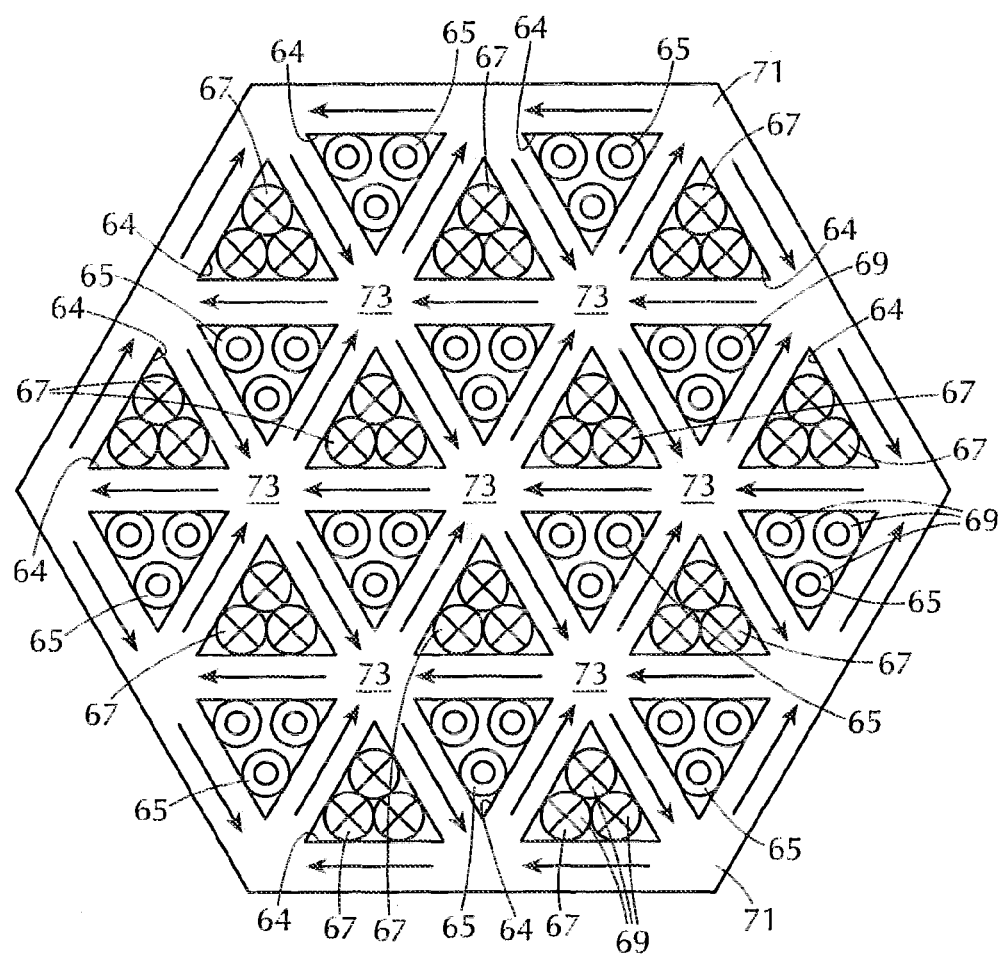
FIG. 5 is a schematic diagram of a cross-section of a 24-wire embodiment according to the invention.

FIG. 5 shows another embodiment of the invention, which may also be used as the carrier 17 in the circuit of FIG. 1. The cross section shown in FIG. 5 is the same over the length of the carrier, and the carrier has two connections at each end, as seen in FIG. 1.

In the embodiment of FIG. 5, conductors 65 carry current in the carrier 71 in one direction and conductors 67 carry the return current in the other direction. All the wires of a given respective set 65 or 67 are connected in parallel with each other by branching structures similar to those of FIG. 2, so as to carry the associated current in parallel with the other conductors of the same set, and so as to deliver the current to a single connector at the opposite end of the carrier 71, essentially with pairs of lines 13 and 15, 19 and 21, as seen in FIG. 1.

In FIG. 5, the arrows indicate the direction of the magnetic fields formed by the conductors. Conductors 65 generate a counterclockwise magnetic field and conductors 67 generate a clockwise magnetic field as shown in the diagram. The triangular channels 64 each have three sides, each side inwardly facing the three wires of the associated conductor and outwardly facing either a conductor of the other set of conductors or the outer surface of the carrier 71. As a result, the magnetic fields in the interstitial magnetic flow regions between the faces of adjacent triangular channels extend in the same direction, and do not conflict with each other.

Magnetic fields also extend along the outer surface of the carrier 71, canceling each other out perpendicular to the surface, but with partial outwardly or inwardly directed magnetic fields, as indicated by the arrows in FIG. 3. Radially inward of the carrier 71, the magnetic fields meet and cancel each other out at the six-direction intersections or junctions 73 in the interior, resulting in no net magnetic field at these intersections.

Figure 6:
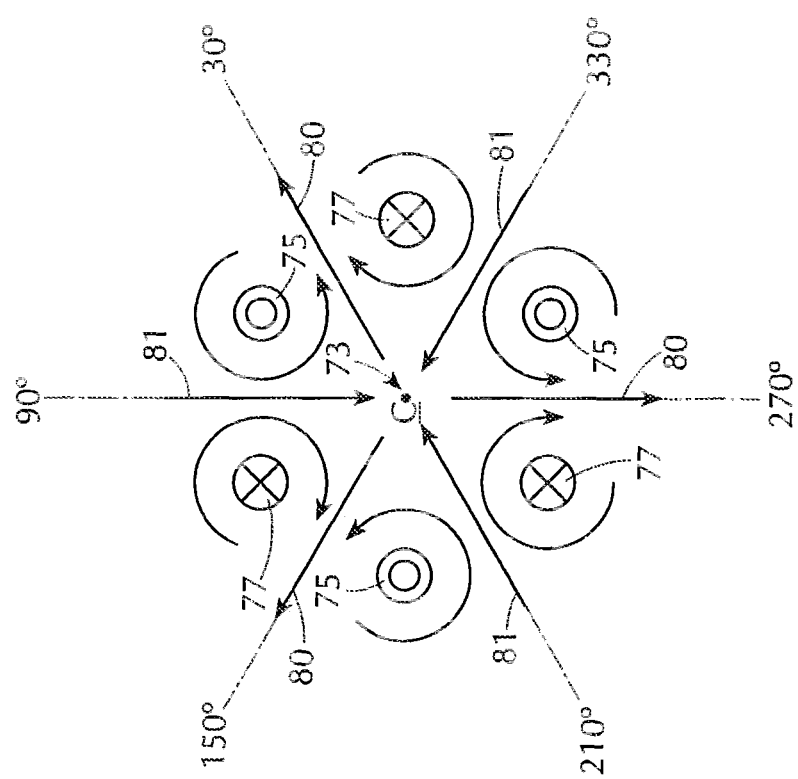
FIG. 6 is a detail partial diagram illustrating an exemplary one of the magnetically balanced junctions in the carrier of FIG. 5.

FIG. 6 illustrates the geometrical relationship and the mutual cancellation of magnetic fields inside the carrier at each junction 73. Six conductors surround the junction 73, and three of these, conductors 75, carry the current in one direction and three, conductors 77, carry the returning current in the opposite direction. The three conductors 75 are each adjacent two of the other conductors 77 such that in half of the interstitial regions the magnetic fields produced flow outwardly away from the junction 73, as indicated by magnetic field arrows 80, and, on the other side, inwardly toward the junction 73, as shown by arrows 81.

It will be apparent that the outgoing magnetic field flow arrows 80 are approximately equally distributed about a circle centered at the center point C at 120 degrees displacement to each other. As a result, the three magnetic fields indicated by the arrows 80 at 30°, 180° and 270° combine to cancel each other out. Similarly, the 120-degree staggered three inward flowing magnetic fields 81 at 90°, 210° and 330° also cancel each other out, resulting in little or no total magnetic field at junction 73.

The carrier with this type of six-wire junction is preferably a hexagonal carrier as seen in FIG. 3, but may alternatively be smaller, e.g., a single hexagonal group of six wires with a single junction, or may also be any configuration made by combining two or more junctions 73 each having six surrounding conductors 75 and 77, some of which may be shared between adjacent junctions 73. The conductors may each comprise one, three, or generally any number of wires. As with the rectangular matrix arrangement of FIG. 3, each junction 73 shares at least two of its wires, one from each set 75 with an adjacent junction 73.

A general principle of the conducting carrier of the invention is that the sets of incoming and outgoing power lines are organized in a matrix or other pattern configuration in a plane perpendicular to the diameter of the extension of the lines. That pattern has the lines grouped around junctions or intersections of the magnetic field pathways between the lines. Each junction is surrounded by a number 2N of lines, N lines of which carry the electrical connection in one direction, and the other N lines of which carry the returning electrical current in the opposite direction. The 2N lines are grouped substantially equally staggered about the junction center point C, each at 180/N degrees rotational displacement relative to the next adjacent line in the group around the junction. The lines are also alternated as one proceeds around the junction so that if a given line carries current in one direction, the adjacent lines on either side of it, which are rotationally separated by 180/N degrees around the center of the junction from the line on either side, carry power in the opposite direction.

In this configuration, the opposing current lines cooperate in creating magnetic fields flowing, either toward or away from the junction, in the same direction in the intersectional pathways between the wires. By "pathways," it is meant the magnetic flow regions between the lines, which may be filled with insulation or spaces containing air, or in any case preferably magnetically-neutral, non-conductive material or gas. Metallic, ferromagnetic or other materials having an effect on the dielectric properties of the separating distance between the lines may be placed in the passageways to reduce any capacitance in the system.

The number N may be 2, as in FIGS. 3 and 4, or it may be 3, as in FIGS. 5 and 6. Even larger numbers N of conductors, e.g., 4 or 5 or higher, may also be used to form a ring around each the junction. In the various configurations where N is 2 or greater, some of the wires around a first junction may also serve as wires in other adjacent junctions in the cross sectional arrangement. Depending on the number N employed, adjacent junctions may have different numbers of wires arranged around their respective center points.

Figure 7:
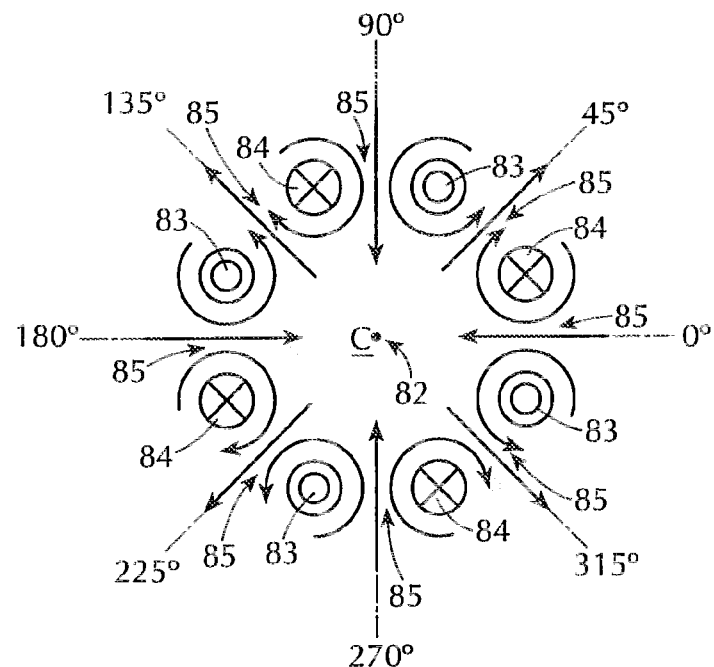
FIG. 7 is a diagram of a magnetically balanced junction surrounded by eight wires.

FIG. 7 shows a detail of an alternate embodiment carrier in which a junction 82 is surrounded by eight wires, i.e., N=4. Four wires 83 carry current in one direction (out of the page of the diagram) and the other four wires 84 carry current in the opposite direction (into the page of the diagram). The magnetic fields flow away from junction 82 in passageways 85 generally following the arrows at 45°, 135°, 225° and 315°, canceling each other out to zero. The magnetic fields flow into the junction 82 through passageways 85 generally following the arrows at 0°, 90°, 180° and 270°, also canceling each other out to zero. The result is overall a zero net magnetic field in the junction 82.

The junction structure of FIG. 7 may be adjacent one or more other similar eight-wire junctures. For each additional eight-wire junction, one wire 83 and an adjacent wire 84 from the first junction 82 are part of the additional junction, together with six other wires in addition to those of the first junction 82.

Figure 8:
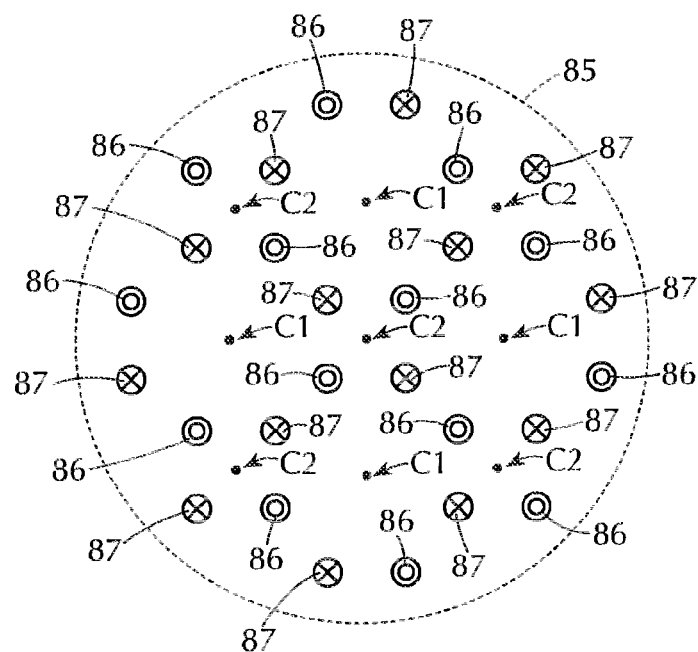
FIG. 8 is a cross-sectional diagram of another alternate embodiment of carrier according to the invention.

Referring to FIG. 8, an alternate embodiment of a carrier according to the invention has a carrier body 85 preferably of insulating material with a cross section as shown. A first set of wires 86 extend through the carrier body 85 in parallel carrying electrical current in one direction, and another set of wires 87 linked in parallel extending through the carrier body 85 and carrying electrical current in the opposite direction. The wires 85 and 86 are organized in a pattern over the length of the carrier.

In this pattern, the wires are in octagonal or square groups, as shown in the FIG. 7 and FIG. 4. Each octagonal group has a center point C1, and each square group has a center point C2. The wires are arranged therearound equally distributed rotationally, alternating between wires 86 and wires 87. The result is that the magnetic fields produced by wires 86 and 87 combine to cancel each other out in the individual junctions C1 and C2, as has been described above in regard to the previous embodiments with octagonal or square junction groups of wires, so that the magnetic fields total to approximately zero at each junction about a center point C1 or C2.

Figure 9:
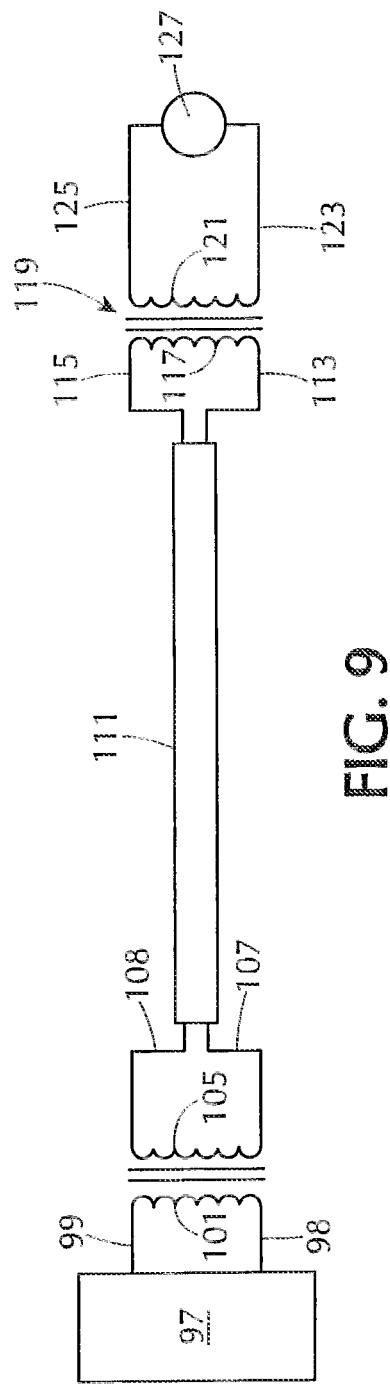
FIG. 9 is a schematic diagram of another circuit making use of a carrier according to the invention.

Circuits for application of conductors according to the invention include the circuit of FIG. 9. A power source 97 supplies AC or DC current via two opposing contacts 98 and 99 leading two and from an input coil 101 of a transformer 103, which is preferably a step-up transformer that increases the current voltage. Transformer 103 has an output coil 105 connecting with output lines 107 and 108 that lead to a carrier 111 configured with multiple wires is a parallel arrangement with cross-sectional pattern having one or more zero-net-magnetic-field junctions, such as found in, e.g., any of the previously described embodiments. The electrical current of the lines 107 and 108 is carried to and from the opposing end of carrier 111, where the parallel sets of wires thereon connect with lines 113 and 115, which connect to the input coil 117 of a second transformer 119, which preferably steps down the voltage received. Transformer 119 has a second coil 121 connected to two lines 123 and 125 connecting with load 127. As in the embodiment of FIG. 1, load 127 may be a lamp or motor, or any device powered by the electrical current. The circuit of FIG. 9 provides for efficient transmission of power from source 97 to load 127 with reduced external magnetic fields produced.

Figure 10:
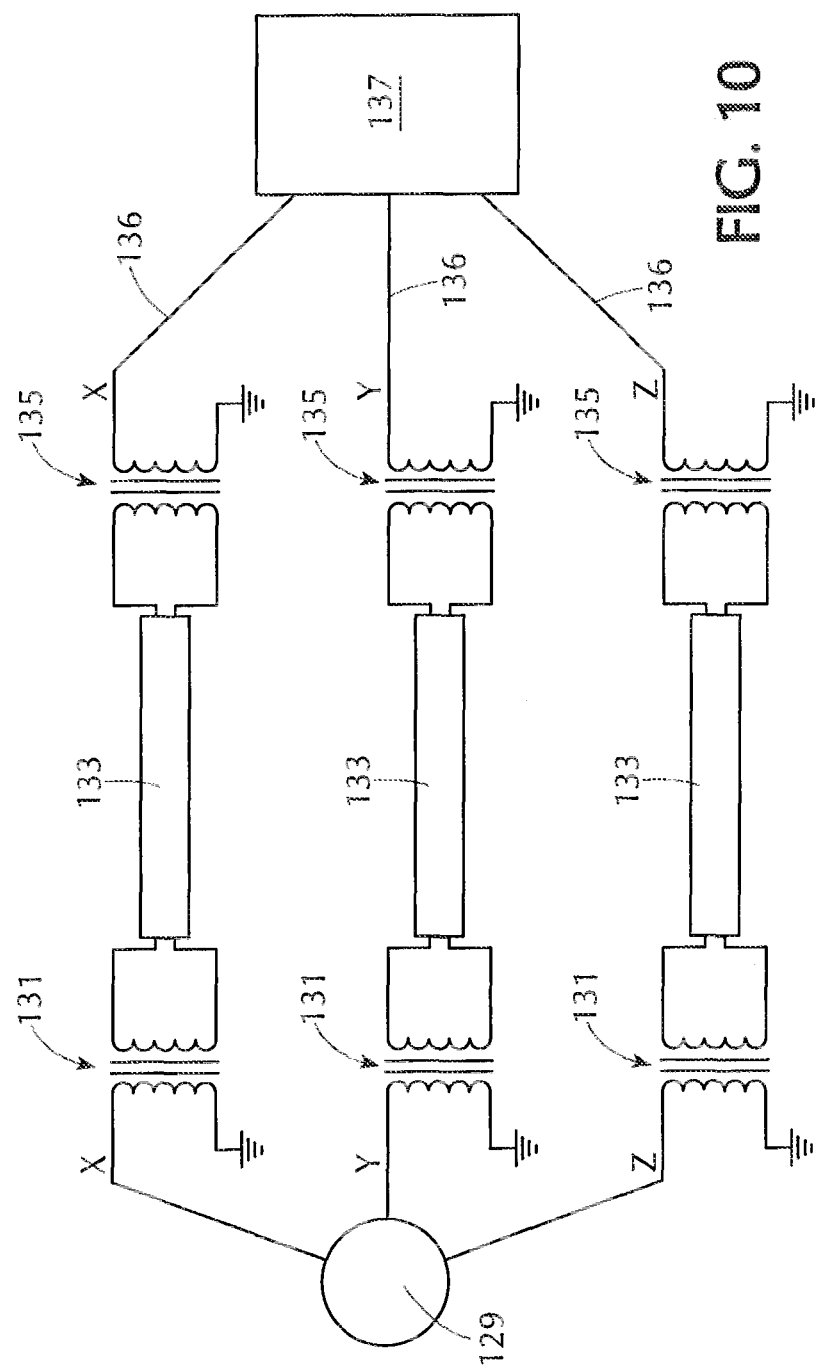
FIG. 10 is a schematic diagram of a three-phase AC power distribution circuit employing carriers according to the invention.

Referring to FIG. 10, another embodiment of circuit employing power carriers according to the invention transmits multi-phase AC current from a power source that produces three phases x, y, and z of AC electrical power. Each phase x, y and z is supplied to the input coil of a respective step-up transformer 131, which taps at its other end to the ground. Transformers 131 have output coils each of which is connected to an end of a respective carrier 133 configured according to the various embodiments described above. The outputs of the carriers 133 are each connected with a respective step down transformer 135, which reduces the voltage of current in the carrier 133 back to its original level. The transformers 135 each have an output line 136 that connects to and supplies a respective phase x, y, or z of the AC power to load 137, which may be anything that uses or operates on AC power. The other line from the transformer output coil goes to ground. In this embodiment, AC power is efficiently supplied via low magnetic field carriers 133 to load 137.

In any of the above embodiments, the conducting wires may be superconducting wires.

Figure 12:
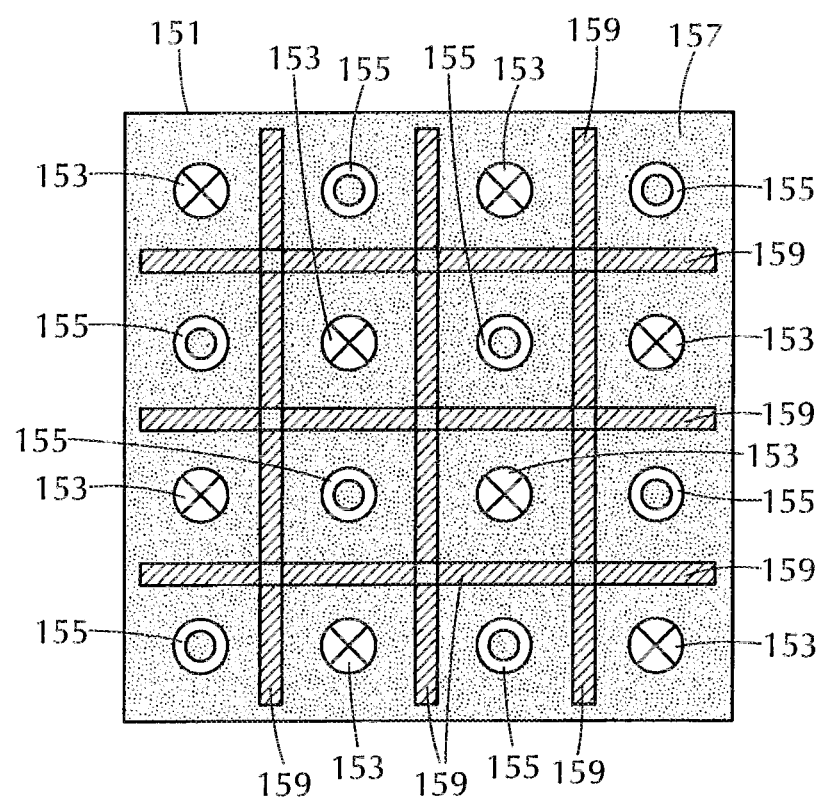
FIG. 12 is a cross-sectional diagram of an alternate embodiment of carrier having metallic inserts to reduce capacitance.

The carrier according to the invention may have a capacitance created over its length between the incoming and returning currents, which may be undesirable. FIG. 12 shows a carrier 151 in which the capacitance is reduced, as has been mentioned above. Two sets of incoming and outgoing wires 153 and 155 are supported in insulating material 157. Also supported in the insulating material 157 are a number of bars 159 of conductive or ferromagnetic materials between the wires 153 and 155 in the magnetic passageways between them. The pieces of conductive or ferromagnetic material 159 extend over the entire length of the carrier 151, each lying in a respective passageway between wires 153 and 155 so as to reduce the dielectric between the wires, and as a result the capacitance. The individual pieces 159 may have slight contact at their corners, but are generally electrically separate from each other.

EXAMPLE

An experiment was conducted to determine the efficacy of a carrier according to an embodiment of the invention.

Figure 11:
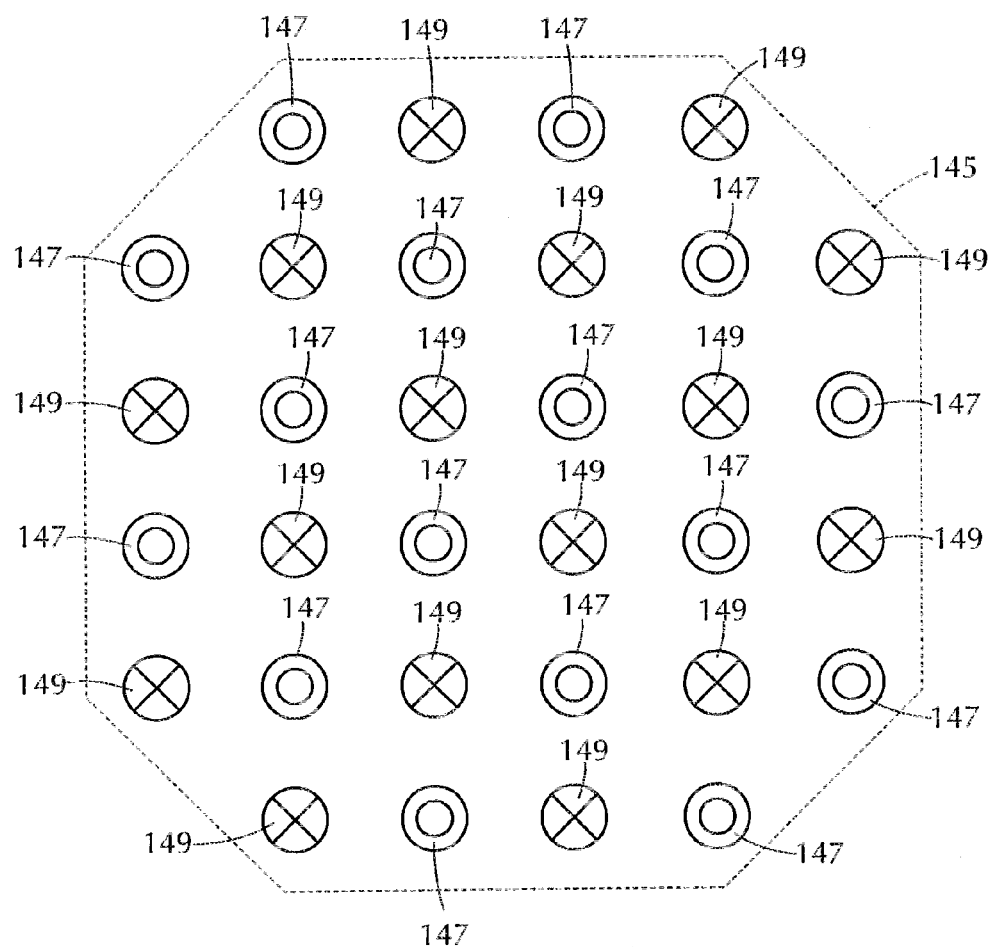
FIG. 11 is a cross-sectional diagram of the arrangement of the wire conductors in the carrier used in the example.

For the experiment, the carrier used was of a cross section as seen in FIG. 11. The carrier 145 was formed as a matrix of wires 147 and 149, all of which were 28 AWG stranded wire. The wires 147 and 149 were supported in a matrix arrangement as shown, where the wires were spaced 0.05" apart in the rows and the columns. Wires 147 were all connected in parallel and wires 149 were all connected in parallel as in the schematic of FIG. 2. The insulation referenced generally as 151 around the wires 147 and 149 was 300 volt gray PVC insulation.

As a control example, a typical two wire electrical cord was used.

A 120 volt AC power source was connected at one end of the two-wire electrical cord, and a 950 watt power load was connected at the other end. The magnetic field around the two-wire cord was then measured, yielding a reading of 72 milliGauss.

The same 120 volt AC power source was connected at one end of the carrier, and the other end of the carrier was connected to the same 950 watt power load. The magnetic field around the carrier was then measured. The measured field strength was from 5 to 6 milliGauss, a reduction of more than 90%.

While the present invention has been described with reference to the specific embodiments, the description is illustrative of the invention and is not to be construed as limiting the invention. Various modifications can be made to the preferred embodiments without departing from the spirit and scope of the invention as defined by the claims. It will be understood that the invention herein extends well beyond the embodiments of the disclosure, and the terms used in this specification should be understood to be language of description, not limitation, as those of skill in the art with this specification before them will be able to make changes and modifications therein without departing from the spirit of the invention.

What is claimed is:

1. A system transmitting an electrical current, said system comprising:
   a power carrier comprising:
   a proximal end having first and second proximal electrical connections leading thereto;
   a first set consisting of a number that is at least three of electrical conductors all electrically connected in parallel with the first proximal electrical connection, and a second set consisting of said number of electrical conductors all electrically connected in parallel with the second proximal electrical connection;
   the electrical conductors extending over a length of the carrier and being supported so as to be electrically separate from each other over said length in a cross-sectional arrangement relative to one another in the carrier; and
   a distal end opposite the proximal end and having first and second distal electrical connections leading therefrom;
   the first set of electrical conductors all electrically connected in parallel with the first distal electrical connection, and the second set of electrical conductors all electrically connected in parallel with the second distal electrical connection; and
   the first and second sets of electrical conductors being positioned in said cross-sectional arrangement such that a first electrical conductor from the first set is surrounded by at least three electrical conductors of the second set each at a respective distance from the first electrical conductor of the first set such that a respective magnetic field passageway is defined between each of the at least three electrical conductors of the second set and the first electrical conductor of the first set, and such that a first electrical conductor from the second set is surrounded by at least three electrical conductors of the first set each at a respective distance from the first electrical conductor of the first set such that a respective magnetic field passageway is defined between each of the at least three electrical conductors of the first set and the first electrical conductor of the second set; and
   the system further comprising
   an electrical power supply supplying electrical current to the first proximal electrical connection; and
   an electrical load connected between the first and second distal electrical connections;
   the electrical current flowing through the first set of electrical conductors, then through the load, then back through the carrier through the second set of electrical conductors; and
   wherein the power carrier has no electrical conductors carrying any electrical current to the load except for the electrical conductors of the first and second sets.

2. The invention according to claim 1, wherein the electrical conductors of the respective other of said sets surrounding each of the first electrical conductors are substantially equidistant therefrom and are substantially equally distributed thereabout.

3. The invention according to claim 1, wherein each of the first electrical conductors is surrounded by at least four of said electrical conductors of the respective other of said sets.

4. The invention according to claim 1, wherein each of the first electrical conductors is surrounded by no more than three electrical conductors of the respective other of said sets equidistant therefrom and arranged staggered 120 degrees apart from each other therearound so as to form a respective triangular arrangement around each of the first electrical conductors.

5. The invention according to claim 3, wherein each of the first electrical conductors is surrounded by no more than four electrical conductors of the respective other of said sets equidistant therefrom and arranged staggered 90 degrees apart from each other therearound so as to form a respective square arrangement around each of the first electrical conductors.

6. The invention according to claim 1,
   wherein, in the cross-sectional arrangement, the electrical conductors of the sets are positioned so that four of the electrical conductors from each set are in an octagonal arrangement surrounding a first junction area, with the conductors of the first set alternating with the conductors of the second set about the first junction area of the octagonal arrangement, and
   wherein two of the electrical conductors of each of the sets of electrical conductors are in a square arrangement surrounding a second junction area with the conductors of the sets alternating about the second junction area, one of said two electrical conductors of each of the sets being also in the octagonal arrangement surrounding the first junction area.

7. The invention according to claim 1, wherein the cross-sectional arrangement is constant over the length of the carrier.

8. The invention according to claim 1, wherein first branching structures electrically link ends of the electrical conductors of the first set to the first proximal and distal electrical connectors, respectively, and second branching structures electrically link ends of the electrical conductors of the second set to the second proximal and distal electrical connectors, respectively.

9. The invention according to claim 1,
   wherein, in the cross-sectional arrangement, the electrical conductors of the sets are positioned so that the electrical conductors surround first and second junction areas,
   wherein the first junction area is surrounded by two of the electrical conductors of each of the sets of electrical conductors in a first square or rectangular configuration, and
   wherein the second junction area is surrounded by two of the electrical conductors of the first rectangular or square configuration and one or more additional electrical conductors of the first set and one or more additional electrical conductors of the second set.

10. The invention according to claim 9, wherein the electrical conductors surrounding the second junction area are in a second square or rectangular configuration.

11. The invention according to claim 10, wherein the cross sectional arrangement is an array having at least two rows and two columns, wherein the electrical conductors from the first set alternate with the electrical connectors in the second set along each row and along each column, such that further junction areas are defined between the rows and columns each surrounded by a respective subset of two electrical conductors of each set.

12. The invention according to claim 11, wherein the array has at least four rows and four columns.

13. The invention according to claim 1, wherein insulating material surrounds each of the electrical conductors.

14. The invention according to claim 13 wherein pieces of material are supported between electrical conductors in at least some of the magnetic field passageways, said material being selected that the pieces of material reduce dielectric separation between at least some of the electrical conductors of one of the sets and one or more adjacent electrical conductors of the other set.

15. The invention according to claim 1, wherein the sets each include at least twelve electrical conductors, and the electrical conductors are positioned in the cross-sectional arrangement so as to define at least seven junction areas wherein two or more of the magnetic field passageways meet, a first of said junction areas having six of said junction areas positioned therearound staggered at approximately 60 degrees relative to each other about the first junction area, a respective group made up of three electrical conductors from the first set and three electrical conductors from the second set surrounding each of said junction areas, said electrical conductors of each of the groups alternating between the two sets around the respective junction area and being staggered at about 60 degrees relative to each other thereabout.

16. The invention according to claim 1, wherein the electrical power supply supplies an opposing pole to the electrical current at the second proximal electrical connection.

17. The invention according to claim 1, further having a first transformer changing the voltage of the electrical current before it is supplied to the first proximal connection and a second transformer changing the voltage of the electrical current between the first distal electrical connection and the load.

18. A power carrier for transmitting an electrical current, said power carrier comprising:
   a proximal end having first and second proximal electrical connections leading thereto;
   a distal end opposite the proximal end and having first and second distal electrical connections leading therefrom;
   a first set of electrical conductors all electrically connected in parallel between the first proximal electrical connection and the first distal electrical connection, and a second set of electrical conductors all electrically connected in parallel between the second proximal electrical connection and the second distal electrical connection, wherein said first and second sets of said electrical connectors are each made up of the same number of said electrical conductors;
   the electrical conductors extending over a length of the carrier and each being surrounded by insulating material so as to be electrically separate from each other over said length in a cross-sectional arrangement relative to one another in the carrier, said cross-sectional area remaining constant over the length of the carrier;
   the first set of electrical conductors all being electrically connected in parallel with the first distal electrical connection, and the second set of electrical conductors all electrically connected in parallel with the second distal electrical connection; and
   the first and second sets of electrical conductors being positioned in said cross-sectional arrangement so that a plurality of groups of said electrical conductors each define a respective centerpoint around which the electrical conductors of the group are arranged;
   wherein each group has an equal number not less than two of said electrical conductors of each of said sets positioned equidistant from the respective center point, spaced around the respective centerpoint at equal angular displacements relative to each other, and alternating around the respective centerpoint thereof between the electrical conductors of the first set and the electrical conductors of the second set; and
   the cross sectional arrangement of the electrical conductors is a rectangular matrix with at least nine centerpoints or a hexagonally packed pattern with at least seven centerpoints and
   wherein the power carrier has no electrical conductors carrying any electrical current except for the electrical conductors of the first and second sets.

19. The invention according to claim 18, and further comprising
   a power supply transmitting a pole of the electrical current to the first proximal electrical connection and connecting an opposing pole of the electrical current to the second proximal electrical connection; and
   a transformer connected with the distal electrical connections and a load so as to receive the electrical current therefrom, change a voltage thereof and supply the electrical current to the load, and to return the electrical current via the second distal electrical connection to the carrier and the power supply.

20. A method of transmitting electrical power comprising providing a carrier according to claim 1, and
   supplying electrical current to the first proximal electrical contacts so that the current flows through the first set of conductors to the first distal electrical connection, through a transformer and to a load;
   receiving a return electrical current from the load via the transformer to the second distal electrical connection and through the second set of electrical conductors.

21. The invention according to claim 9, wherein the electrical conductors surrounding the second junction area are in an octagonal configuration.

22. The invention according to claim 1, wherein the electrical current is a phase of AC current.

23. The invention according to claim 22, wherein the second proximal electrical connection is connected to a complementary phase of said AC current or to ground.

* * * * *